United States Patent
Davis et al.

(10) Patent No.: US 11,277,330 B1
(45) Date of Patent: Mar. 15, 2022

(54) MULTI-DOMAIN NETWORK PATH COMPUTATION WITH MINIMAL MODEL AND DATA SHARING BETWEEN DOMAINS

(71) Applicant: Ciena Corporation, Hanover, MD (US)

(72) Inventors: Nigel Robert Davis, Edgware (GB); John Wade Cherrington, Salt Spring Island (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/076,134

(22) Filed: Oct. 21, 2020

(51) Int. Cl.
*G06F 15/173* (2006.01)
*H04L 45/00* (2022.01)

(52) U.S. Cl.
CPC ............ *H04L 45/04* (2013.01); *H04L 45/26* (2013.01)

(58) Field of Classification Search
CPC .................................. H04L 45/04; H04L 45/26
See application file for complete search history.

(56) References Cited

U.S. PATENT DOCUMENTS

| | | |
|---|---|---|
| 6,990,517 B1 | 1/2006 | Bevan et al. |
| 7,164,679 B2 | 1/2007 | Kotha et al. |
| 7,782,879 B2 | 8/2010 | Roch et al. |
| 7,852,863 B2 | 12/2010 | Madrahalli et al. |
| 8,045,551 B2 | 10/2011 | Madrahalli et al. |
| 8,127,042 B1 | 2/2012 | Davis et al. |
| 8,300,625 B2 | 10/2012 | Shew et al. |
| 8,531,969 B2 | 9/2013 | Ong |
| 8,572,485 B2 | 10/2013 | Smith et al. |
| 8,682,160 B2 | 3/2014 | Prakash et al. |
| 8,750,706 B2 | 6/2014 | Boertjes et al. |
| 8,817,798 B2 | 8/2014 | Skalecki et al. |
| 9,071,532 B2 | 6/2015 | Oltman et al. |
| 9,124,960 B2 | 9/2015 | Swinkels et al. |
| 9,172,658 B2 | 10/2015 | Kakkar et al. |
| 9,357,278 B2 | 5/2016 | Swinkels et al. |
| 9,407,359 B2 | 8/2016 | Swinkels et al. |
| 9,497,521 B2 | 11/2016 | Sareen et al. |
| 9,503,228 B2 | 11/2016 | Subhedar et al. |
| 9,838,296 B2 | 12/2017 | Armolavicius et al. |
| 9,948,387 B2 | 4/2018 | Frankel et al. |

(Continued)

OTHER PUBLICATIONS

Y. Li, Y. Zhao, J. Zhang, X. Yu, H. Chen and G. Zhang, "Demonstration of multi-domain spectrum defragmentation with minimum controller-participation degree in elastic optical networks," in IEEE/OSA Journal of Optical Communications and Networking, vol. 9, No. 9, pp. 782-791, Sep. 2017 (Year: 2017).*

*Primary Examiner* — Richard G Keehn
(74) *Attorney, Agent, or Firm* — Clements Bernard Baratta; Lawrence A. Baratta, Jr.; Christopher L. Bernard

(57) ABSTRACT

An orchestration layer includes one or more processing devices communicatively coupled to a plurality of domains in a multi-domain network, wherein the one or more processing devices are configured to receive a request for a path, wherein the path is requested from a source in a first domain to a destination in a second domain in a multi-domain network including a plurality of domains, relay the request to each domain in the multi-domain network, and wherein each domain in the multi-domain network is configured to compute a matrix fragment and the matrix fragments from a plurality of domains are used to find the path, and provide a response with the path from the source in the first domain to the destination in the second domain.

20 Claims, 8 Drawing Sheets

(56) References Cited

U.S. PATENT DOCUMENTS

| | | |
|---|---|---|
| 10,015,057 B2 | 7/2018 | Djukic et al. |
| 10,033,623 B2 | 7/2018 | Jain et al. |
| 10,057,135 B2 | 8/2018 | Shew et al. |
| 10,097,306 B1 | 10/2018 | Chhillar et al. |
| 10,148,578 B2 | 12/2018 | Morris et al. |
| 2002/0165961 A1 | 11/2002 | Everdell et al. |
| 2003/0188228 A1 | 10/2003 | Davis et al. |
| 2006/0203747 A1 | 9/2006 | Wright et al. |
| 2008/0095176 A1 | 4/2008 | Ong et al. |
| 2012/0224845 A1 | 9/2012 | Swinkels et al. |
| 2012/0226824 A1 | 9/2012 | Trnkus et al. |
| 2016/0028586 A1* | 1/2016 | Blair .................. H04L 41/0826 398/45 |
| 2017/0187606 A1* | 6/2017 | Chen ........................ H04L 45/02 |
| 2017/0244628 A1* | 8/2017 | Chen .................. H04L 12/4633 |
| 2017/0257228 A1* | 9/2017 | Chen ..................... H04L 47/825 |
| 2018/0359133 A1 | 12/2018 | Shew et al. |
| 2019/0230046 A1 | 7/2019 | Djukic et al. |
| 2021/0092060 A1* | 3/2021 | Munson ................ H04L 9/3213 |
| 2021/0112008 A1* | 4/2021 | Rahouti .................. H04L 45/02 |

* cited by examiner

MULTI-DOMAIN NETWORK PATH COMPUTATION WITH MINIMAL MODEL AND DATA SHARING BETWEEN DOMAINS

FIELD OF THE DISCLOSURE

The present disclosure generally relates to networking. More particularly, the present disclosure relates to systems and methods for multi-domain network path computation with minimal model and data sharing between domains.

BACKGROUND OF THE DISCLOSURE

A multi-domain network is one where there are different network operators such as one per domain or where there may be one or more network operators that segment their network into distinct domains. A domain is a portion of the network that is self-contained, independent from other domains. That is, a domain is a management or administrative concept where it is managed independently from other domains. Further, a multi-layer network is one having network resources at different layers in the networking stack, such as Layer 0 (photonic), Layer 1 (Time Division Multiplexing (TDM)), Layer 2 (packet), etc. Path computation and a Path Computation Element (PCE) are well-known constructs in networking for determining and finding a suitable path (route) for sending data, at one or more layers and across the multiple domains, between a source and a destination. There has been significant work in path computation, solving optimal routing problems, etc. The present disclosure relates to such areas, in particular focusing on path computation where there are multiple management or administrative domains (or simply domains).

Conventionally, there are three general areas for multi-domain path computation, namely (1) a centralized approach, (2) a distributed router/protocol-based approach, and (3) a distributed Network Management System (NMS)-based approach. The centralized approach may include Software Defined Networking (SDN). In this approach, the multiple domains are observed with sufficient detail by a centralized compute element—an "all-knowing" PCE running on resources at a sufficient scale that it can solve the full problem space required. This is, in particular, a common approach in an era of "cloud"-scale computing. For the distributed router/protocol-based approach, at the other extreme, there are routing algorithms that are fully distributed, where each device uses a form of packet propagation to solve a subset of PCE problems relevant for different standards. Finally, for the distributed NMS-based approach, management systems are used to coordinate with one another in a distributed manner.

One particular concern/constraint is that operators want minimal model sharing and minimal data sharing between domains. This is the primary reason for establishing distinct domains in a single operator environment. In a multiple operator environment, it is simply commercially undesirable to expose all of the details of the network. As such, the centralized approach manifestly breaks both top-level requirements that are aimed at presently—minimal model sharing and minimal data sharing.

In the distributed router/protocol-based approach, only constraints supported by a given protocol are permitted. However, there is a requirement to start from a full set of constraints that an arbitrary NMS might already have implemented, so this approach is limiting. With regard to the distributed NMS-based approach, a concept introduced in RFC 4655, "A Path Computation Element (PCE)-Based Architecture," August 2006, the contents of which are incorporated by reference herein, does suggest this type of solution. To date, the technical discussion has utilized the concept of "crankback." A crankback is where there is a problem in the path computation, and it results in starting over, namely a trial and error approach where a crankback notes the error. Variations of crankback include Simple-cooperating PCEs and Backward Recursive Path Computation (BRPC), such as described in RFC 5441, "A Backward-Recursive PCE-Based Computation (BRPC) Procedure to Compute Shortest Constrained Inter-Domain Traffic Engineering Label Switched Paths," April 2009, the contents of which are incorporated by reference herein.

As noted above, the centralized approach and distributed, non-NMS approaches are not viable as they do not meet the top-level requirements. This leaves other NMS-based distributed routing approaches. Existing approaches for the NMS-based distributed routing approaches include thee crankback and, more recently, Globally Concurrent Optimization (GCO). Generally, crankback based approaches do not pursue concurrency and do not prospectively pursue multiple paths: alternative paths through domains are required based on the failure of the current candidate path; they are not explored ahead of time, for example. Additionally, many crankback-based approaches require a linear chain of domains; however, in the general case is the domains can have arbitrary meshing of interconnects.

GCO addresses the concern of simultaneously routing multiple paths, for example, a bundle of Label Switched Paths (LSPs) through a Layer 2 (L2) Multiprotocol Label Switching (MPLS) network subject to traffic-engineering and/or resiliency goals. This requirement points towards the need for a multiple-path oriented distributed routing solution. However, conventional GCO approaches do not focus on concrete distributed approaches for multiple simultaneous paths.

BRIEF SUMMARY OF THE DISCLOSURE

The present disclosure relates to systems and methods for multi-domain network path computation with minimal model and data sharing between domains. The multi-domain network path computation centers around two design commitments—minimizing the amount of model reconciliation and minimizing the amount of data sharing between domains. The approach leverages NMS capabilities to pursue the concurrent formation of multiple matrix fragments simultaneously across domains and concurrently performing the inter-domain routing through a diffusive tracing approach. The approach also short circuits concurrent work as soon as it is known to be fruitless based on broadcasting back the current lowest weight. Advantageously, despite being highly concurrent and asynchronous, the present approach has properties such as exhaustiveness and observability of completion conditions discussed herein.

In an embodiment, a method implemented by an orchestration layer including steps and a non-transitory computer-readable medium with instructions stored thereon for programming an orchestration layer to perform the steps are described. The steps include receiving a request for a path, wherein the path is requested from a source in a first domain to a destination in a second domain in a multi-domain network including a plurality of domains; relaying the request to each domain in the multi-domain network; obtaining matrix fragments from domains in the multi-domain network, wherein each domain is configured to compute a corresponding matrix fragment and the matrix fragments are used to find the path; and providing a response with the path from the source in the first domain to the destination in the second domain.

Each matrix fragment can include one or more paths through a corresponding domain that have been computed by the corresponding domain with intradomain knowledge and where the intradomain knowledge is excluded from the matrix fragment. Each matrix fragment can be one of a 1×N matrix for a domain with the source having N Inter-Domain Handoff (IDH) points, an A×B matrix for an intermediate domain having A ingress IDH points and B egress IDH points, and an R×(S+T) matrix for a domain with the destination having R ingress IDH points, S egress IDH points, and T paths terminating at the destination.

The matrix fragments can be determined in a phase A path computation, and wherein the steps can further include performing a phase B path computation including finding paths from the source to the destination causing messaging through each internal domain paths in the matrix fragments for each domain of the plurality of domains. The steps can further include performing the phase A path computation and a portion of the phase B computation concurrently as corresponding matrix fragments are determined. The messaging in the phase B path computation can be a trace message that has a weight through the domain added thereto. The steps can further include exiting computation of any path in either the phase A path computation and the phase B path computation based on one or more early exit conditions. Details of internal domain paths can be maintained separate from each of the plurality of domains, and wherein the messaging includes quantitative details for path evaluation without exposing data privacy of the corresponding domain.

In another embodiment, an orchestration layer includes one or more processing devices communicatively coupled to a plurality of domains in a multi-domain network, wherein the one or more processing devices are configured to receive a request for a path, wherein the path is requested from a source in a first domain to a destination in a second domain in a multi-domain network including a plurality of domains; relay the request to each domain in the multi-domain network; obtain matrix fragments from domains in the multi-domain network, wherein each domain is configured to compute a corresponding matrix fragment and the matrix fragments are used to find the path; and provide a response with the path from the source in the first domain to the destination in the second domain.

In a further embodiment, another method implemented by a domain including steps and a non-transitory computer-readable medium with instructions stored thereon for programming the domain to perform the steps are described. The steps include receiving a request from an orchestration layer, wherein the request is based on a path request for a path from a source in a first domain to a destination in a second domain in a multi-domain network including a plurality of domains; computing one or more paths through the domain from any of entry and source to any of an exit and destination, with intradomain knowledge; forming a matrix fragment based on the computing, wherein the matrix fragment includes details of the one or more paths computed with the intradomain knowledge and with the intradomain knowledge excluded from the matrix fragment; and providing the matrix fragment for use in computing the path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for multi-domain network path computation with minimal model and data sharing between domains. The multi-domain network path computation centers around two design commitments—minimizing the amount of model reconciliation and minimizing the amount of data sharing between domains. The approach leverages NMS capabilities to pursue the concurrent formation of multiple matrix fragments simultaneously across domains and concurrently performing the inter-domain routing through a diffusive tracing approach. The approach also short circuits concurrent work as soon as it is known to be fruitless based on broadcasting back the current lowest weight. Advantageously, despite being highly concurrent and asynchronous, the present approach has properties such as exhaustiveness and observability of completion conditions discussed herein.

Network

Figure 1:
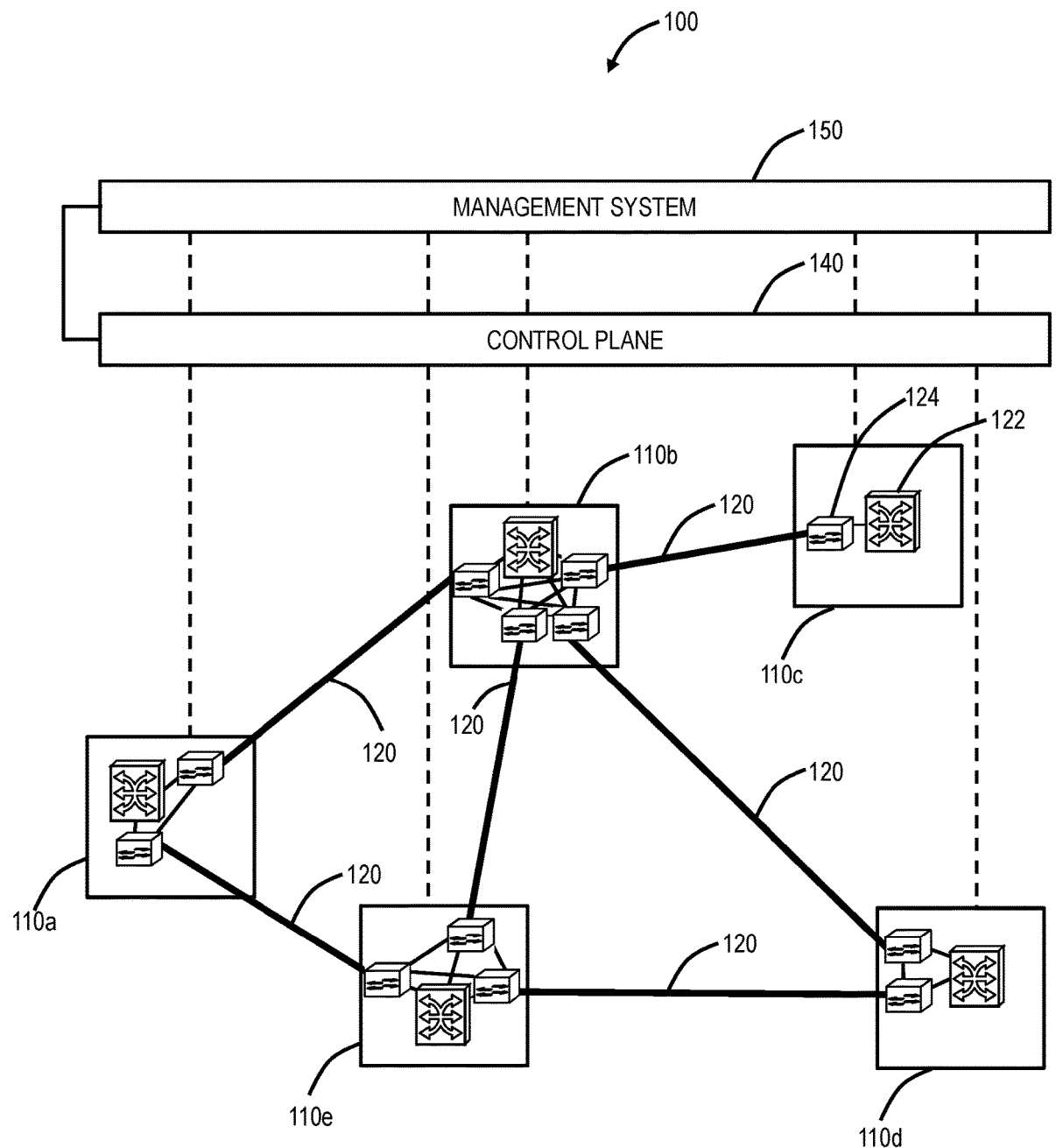
FIG. 1 is a network diagram of an example multi-layer network with five interconnected sites.

FIG. 1 is a network diagram of an example multi-layer network 100 with five interconnected sites 110a, 110b, 110c, 110d, 110e. The sites 110 are interconnected by a plurality of links 120, i.e., fiber spans. Those skilled in the art recognize a physical link 120 can include one or two optical fibers for bidirectional communication. Each of the sites 110 can include a switch 122 and one or more WDM network elements 124. The switch 122 is configured to provide services at Layers 1 (e.g., TDM such as Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. For simplicity of disclosure herein, it will be referred to as a switch in all cases. The WDM network elements 124 provide the photonic layer (e.g., Layer 0) and various functionality associated therewith (e.g., multiplexing, amplification, optical routing, wavelength conversion/regeneration, local add/drop, etc.). Of note, while shown separately, those of skill in the art will recognize that the switch 122 and the WDM network elements 124 may be realized in the same network element. The network 100 is illustrated, for example, as an interconnected mesh network, and those of skill in the art will recognize the network 100 can include other architectures, with additional sites 110 or with fewer sites, with additional network elements and hardware, etc. Of note, the network 100 is presented to illustrate an example domain with network elements for use with the path computation systems and methods described herein. Other networks are also contemplated.

The sites 110 communicate with one another optically over the links 120. The sites 110 can be network elements which include a plurality of ingress and egress ports forming the links 120. The network 100 can include a control plane 140 operating on and/or between the switches 122 at the sites 110a, 110b, 110c, 110d, 110e. The control plane 140 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100, and the control plane 140 can utilize any type of control plane for controlling the switches 122 and establishing connections.

Figure 2:
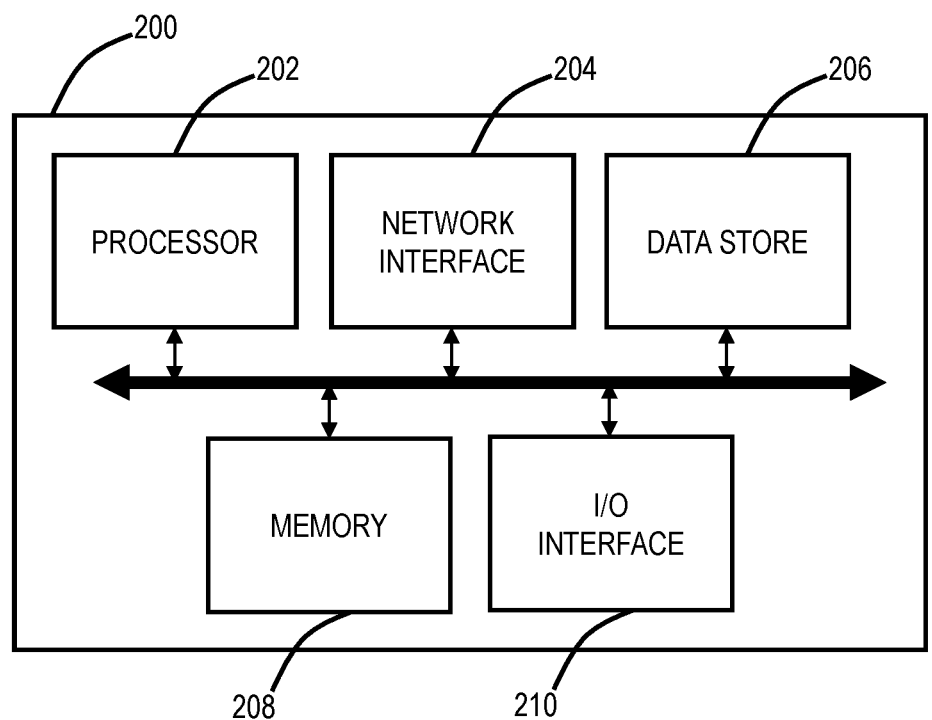
FIG. 2 is a block diagram of a processing device that can form a management system, Path Computation Engine (PCE), etc. for implementing the multi-domain path computation approach of the present disclosure.

The network includes a management system 150, which can be implemented as a processing device 200 described in FIG. 2. The management system 150 supports Operations, Administration, Maintenance, and Provisioning (OAM&P) functions for the network 100, including topology discovery, path computation, etc. The management system 150 can be referred to as a Network Management System (NMS), an Element Management System (EMS), etc. The management system 150 can connect directly to the switches 122 and/or network elements 124, as well as connect through any of the control plane 140. There are various techniques for data communications between the switches 122, the WDM network elements 124, the control plane 140, and the management system 150 for OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols.

Example Processing Device

FIG. 2 is a block diagram of a processing device 200 that can form the management system 150. Also, the processing device 200 can be a module in a network element, e.g., the switches 122, the network element 124. Even further, the processing device 200 can be a planning system or any apparatus configured to perform the various processes, functions, techniques, etc. described herein for path computation. That is, the processing device 200 can be part of a node or a stand-alone device or cluster of devices communicatively coupled to the network 100. The processing device 200 can include a processor 202, which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Background

The present disclosure relates to path computation in a multi-domain and possibly multi-layer network. At the upper layers of the networking stack (e.g., Layer 3 (L3)), individual services or flows have a relatively dynamic quality and their life-cycle and paths are under complete or partial control of distributed routing protocols. In adapting to ongoing demand growth and existing traffic congestion, within layers such as L2 and L3, there is a maximum range of variation possible without making changes to the infrastructure services (such as L1 and L0) that underly them. As described herein, optical and TDM (i.e., L0 and L1) are referred to as infrastructure, i.e., an infrastructure layer having infrastructure services. Looking at these infrastructure layers (L0 and L1), it is noted that the cost-to-change and stakes involved in provisioning new physical installations lead to the following distinctive considerations for the path computation function at these layers.

Path computation includes highly detailed; infrastructure sensitive routing requests that take into account rich constraints based on operator infrastructure planning details and preferences. These are typically systematically scheduled and planned (e.g., part of a long-term capacity growth plan), with the PCE or PCE-adjacent post-processing pipeline. This leads to detailed, device-specific provisioning-ready output. This is particularly the case in the largest, most dominant infrastructure operators.

The type of path computation element (PCE) function required is the traditional purview of NMSs or NMS and planning systems, where the planning function may also be extended or integrated with the Operations Support System (OSS) layer. These contexts, in fact, often call for generating multiple paths (for later user down-selection), advanced domain-rich constraints (such as optical viability), and modeling details not typically considered in protocol-based distributed routing. All these aspects will additionally call for significant compute resources (such as CPU and memory) that are not usually available as part of distributed, in-skin routing. As is known in the art, in-skin means a device or function performed within a network element.

While the distributed routing protocols used at L3 and L2 have achieved a high degree of sophistication in transcending organization boundaries, the above considerations with L1 and L0 are emphasized to contrast and pose the confederation problem for infrastructure-oriented layer path computation federation: if the end-to-end infrastructure is to be established across the boundaries of multiple organization's management domains, how can a distributed path computation function be realized and what properties are fundamental? Also, as is known in the art, a federation is a group of computing or network providers collectively agreeing upon standards of operation.

Apart from interface standardization proposals (RFC 4655, for example, frames the question and obvious high-level approaches, but does specify any detail), there does not exist at present a means to confederate infrastructure routing function across organizational management boundaries effectively, using and conserving as much as possible the existing NMS installed base as the unit of cooperation. Two obvious barriers are as follows:

(a) Reconciliation of Core NMS models: The type of rich PCE defined above for infrastructure routing is highly tied to detailed, expressive network models typical of the modern NMS. While there are model standardization efforts underway continuously across the industry and there may be other considerations that motivate model reconciliation (e.g., through Transport Application Programming Interface (TAPI)) for any given engagement, it is unclear that model alignment processes should always be a hard pre-condition of participating in an infrastructure routing federation. Even if the NMS core models were convergent, many operator's PCE functionalities might have couplings to their own internal OSS or planning data, and it would be an additional challenge to attempt a reconciliation of how this contextualizing data were to be modeled. This, in particular, rules against a commonly alluded to the solution of a "centralized SDN" solution to the problem and rather points to some form of cooperation among NMS PCEs whose view of each other are essentially "black boxes" with highly selective/specific interfaces between them.

(b) Network detail privacy: A major concern with the federation in telecom and infrastructure industries, in general, is the understandable ambivalence on the part of operators to engage in a process that would expose internal infrastructure details to organizations that are competitors for market share. Additionally, as Internet infrastructure is viewed as on par economically and strategically with other critical infrastructure such as the power grid, there may be a regulatory restriction on certain details that arise on a nation by nation basis.

Despite these seemingly steep barriers, there are compelling scenarios where potential competitors coordinate the creation of federated infrastructure spanning their organization control boundaries. To this end, the present disclosure is aimed at solving this problem in a way that addresses the concerns listed above. Specifically, the target requirements are towards a federated PCE framework that has the following properties that directly ameliorate the concerns (a) to (b) above as follows:

(i) Minimal model sharing: To be minimally disruptive to established NMS PCE systems currently in production across network operators, the present disclosure requires the least amount of model reconciliation compatible with cooperating to solve a routing problem. In particular, the only model agreement is demanded on how a particular subset (the federation-supported subset) of routing queries is expressed, as well as some level of normalization of weight scheme used to rank paths. Participants map this bounded space of queries into their respective models in a particular way described herein, but otherwise do not need to reconcile their internal network, planning, or OSS models.

(ii) Minimal data sharing: The present disclosure respects the requirement that the minimum amount of internal data details (of actual routes found) be shared among systems. In particular, the approach described herein only exposes boundary hand-off points, whereby mutual agreement and knowledge one operator network bridges over to another. It is also stipulated that the approach does not require a trusted third party, which would be a non-optimal way to shift privacy concerns versus a solution where the nature of the coordination protocol algorithmically guaranteed privacy.

Again, the present disclosure targets a specific form of distribution, allowing minimally-disruptive federation of PCE function in the context of cooperating NMS/Planning systems. It is not an attempt to contribute a general-purpose distributed PCE algorithm for the "live" or "in-skin" routing that has long been present packet or label-switched devices. In this regard, it is worth noting at this point that the typical time-scale of NMS path computation, while often returning in a second or less, can take as long as several minutes for harder optimizations. It is this time-scale the present disclosure seeks to conserve in the context of federated NMS path computation; i.e., the present disclosure pursues deeper but potentially slower rather than shallower but closer to real-time routing/re-routing.

Definitions

Figure 3:
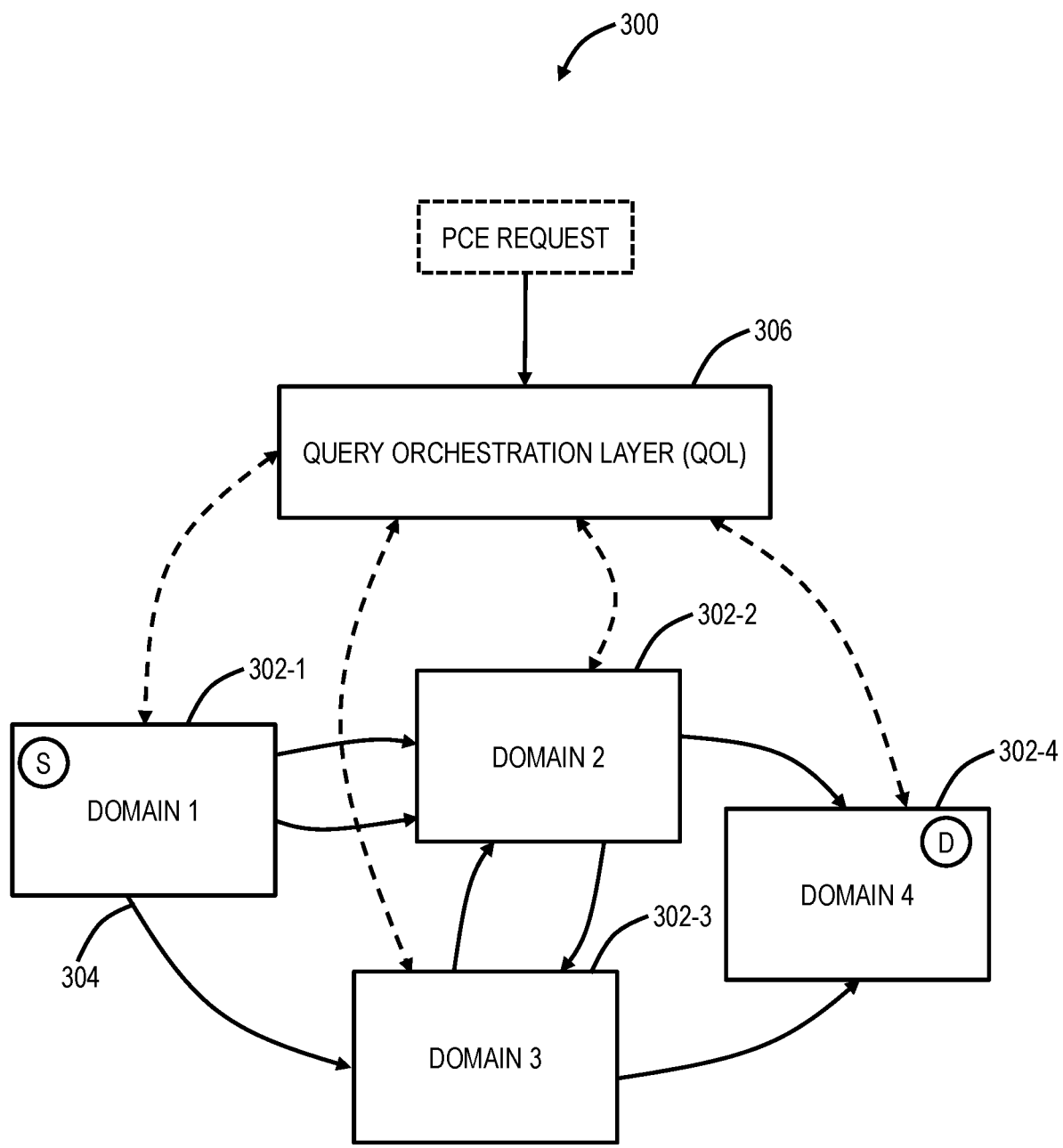
FIG. 3 is a network diagram of a multi-domain network for illustrating the multi-domain path computation approach of the present disclosure.

FIG. 3 is a network diagram of a multi-domain network 300 for illustrating the multi-domain path computation approach of the present disclosure. For the present discussion, assume N different domains 302 (labeled as domains 302-1-302-4), each domain can be owned/operated by N distinct organizations from a network management perspective. The domains 302 can be PCE domains. Also, there can be variations of this reference model, such as one operator that has set up distinct domains 302 for operational reasons.

An Inter-Domain Hand-off (IDH) point 304 is a reference point (e.g., port) that is associated with a shared link, the other side of which also known/visible/managed by a different organization (e.g., the two ends of a fiber-based connection). It is assumed for obvious reasons that the presence of these points is known to both organizations involved (but no internal structure is assumed shared any deeper into the other organization's network). Note, there can be one or more IDHs points 304 between domains 302. Also, some domains 302 may not connect to other domains directly, such as domains 302-1, 302-4, which interconnect via either of the domains 302-2, 302-3.

For expository purposes, the present disclosure is detailed by describing a federated-NMS equivalent of Dijkstra's single-shortest path algorithm as it is solving a commonly occurring optimal path problem and because it is often a starting point or a building block for more advanced routing algorithms. Examples of generalizing this approach to other algorithms are included later. In the conventional form of this algorithm, there is a source S, and target D vertex, and the algorithm finds the shortest path between these on the routing graph, where the shortest is based on a total non-negative cost function defined for each edge involved.

Query Orchestration

For the space of federated queries supported, the present disclosure includes a Query Orchestration Layer (QOL) 306, which provides a singular gateway and a per-domain adaptation of the query into terms meaningful for the internal PCE of each domain 302. The QOL 306 provides relaying of certain messages to coordinate the global routing (described below). Of note, while the QOL 306 does act as a gateway, coordinator, and high-level query translator: it is expressly not a means for centralizing routing data from the participating domains, as would be seen in a centralized SDN approach.

Figure 4:
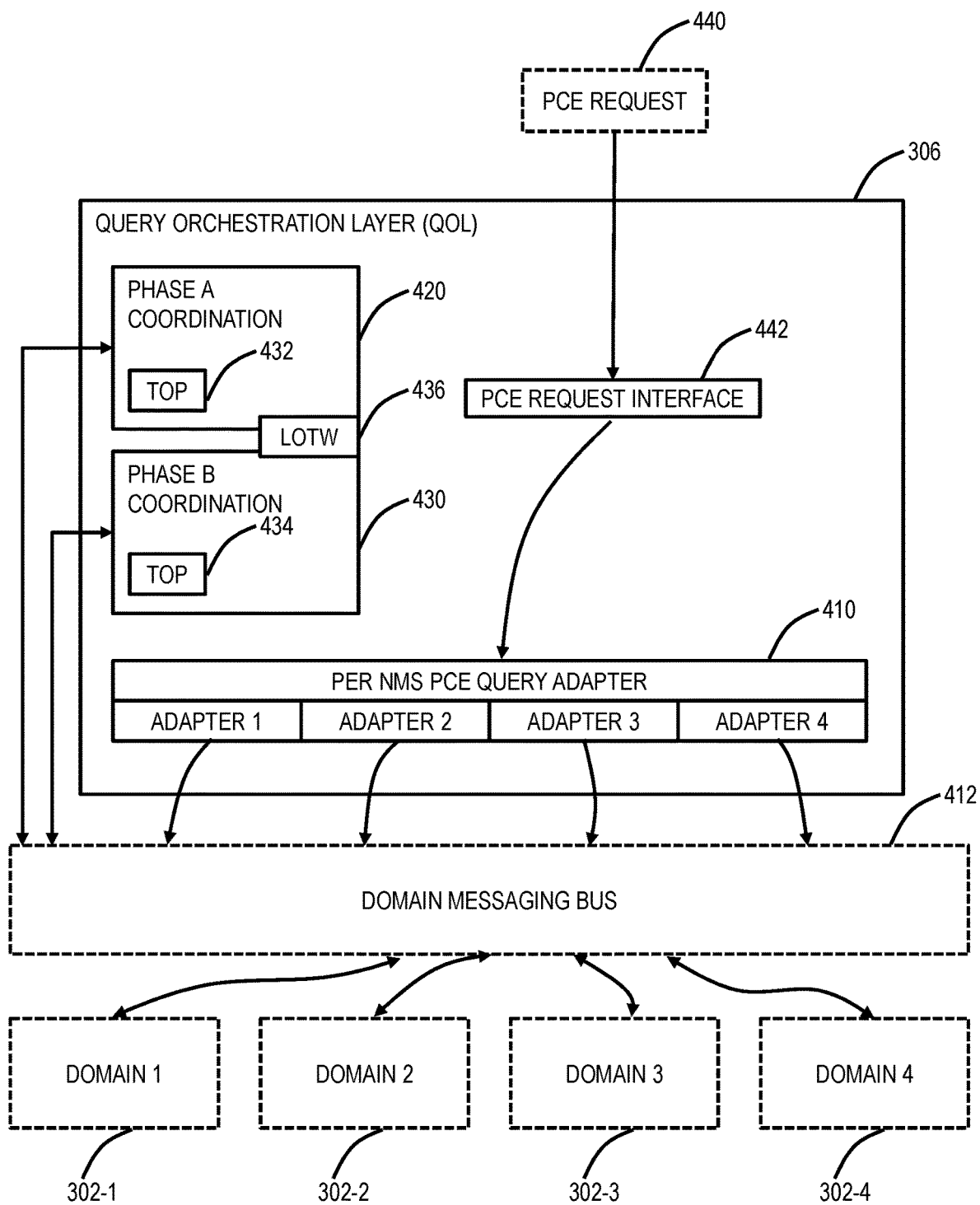
FIG. 4 is a block diagram of additional details of the Query Orchestration Layer (QOL) and connectivity to the domains.

FIG. 4 is a block diagram of additional details of the Query Orchestration Layer (QOL) 306 and connectivity to the domains 302. The QOL can be constructed in the form of a federation of equals, one per domain.

Initial Condition:

To avoid vagaries of a unique named endpoint, the present disclosure assumes the source and target points S, D contain as part of a specification or prefix the source and target domains to which they belong. As described herein, the term target is used to represent the destination, and a target domain includes a domain with the destination therein.

Routing Phases:

The approach described herein includes two phases or steps, labeled Phase A and Phase B. These phases are performed by and between the domains 302, their associated processing devices 200 (e.g., PCEs), and through the QOL 306. The present disclosure, at a minimum, includes aspects of Phase A which focus on domain-specific paths with minimal information sharing. Phase B is presented as an example embodiment for use with Phase A. Further, the description herein is generalized to the functions being performed across the domains 302. Those skilled in the art will appreciate a practical implementation can include a centralized approach or a distributed federation approach.

Phase A Description: (Initiated First) Per Domain Boundary-Targeting Queries.

In this step, the domain 302 that owns the source seeks the shortest path satisfying constraints to both the target as well as to all the connected IDH points 304. For each IDH point 304, a message is sent to the orchestration layer 306 by the domains 302, which initiates a routing calculation whose source is the opposite end entry-point of the IDH point 304 and whose targets are again ultimate target and any IDH points 304 of the current domain 302. Again, the IDH points 304 are in intermediate domains 302, i.e., domains that do not contain the source or destination. The IDH points 304 are nodes that have paths that ultimately lead to the source or destination (the ultimate target) via the intermediate domains 302. Each domain 302 can allow a single Boolean bit to mark the entry point node as having already been analyzed; this avoids looping and redundant work if the diffusive propagation of queries returns to a particular domain 302 via a different path.

Phase A Analysis

The Phase A analysis process will eventually terminate. In domains 302 that do not contain the target (destination), entry IDH points 304 will eventually be exhausted (note, the marking mechanism to avoid repeated routing). In the domain that contains the target, the IDH points 304 will be exhausted and (possibly multiple paths) will be found to the target (target).

Once Phase A of the algorithm completes, there is not yet an end-to-end solution.

Rather, one can think of each of three possible domain types as now holding what can be called one or more matrix fragments. Three types of these occur:

(i) Source domain: a 1×N matrix with N paths leaving. Here, the source S is the '1', and the N paths leave at N IDH points 304 of the source domain.

Figure 5:
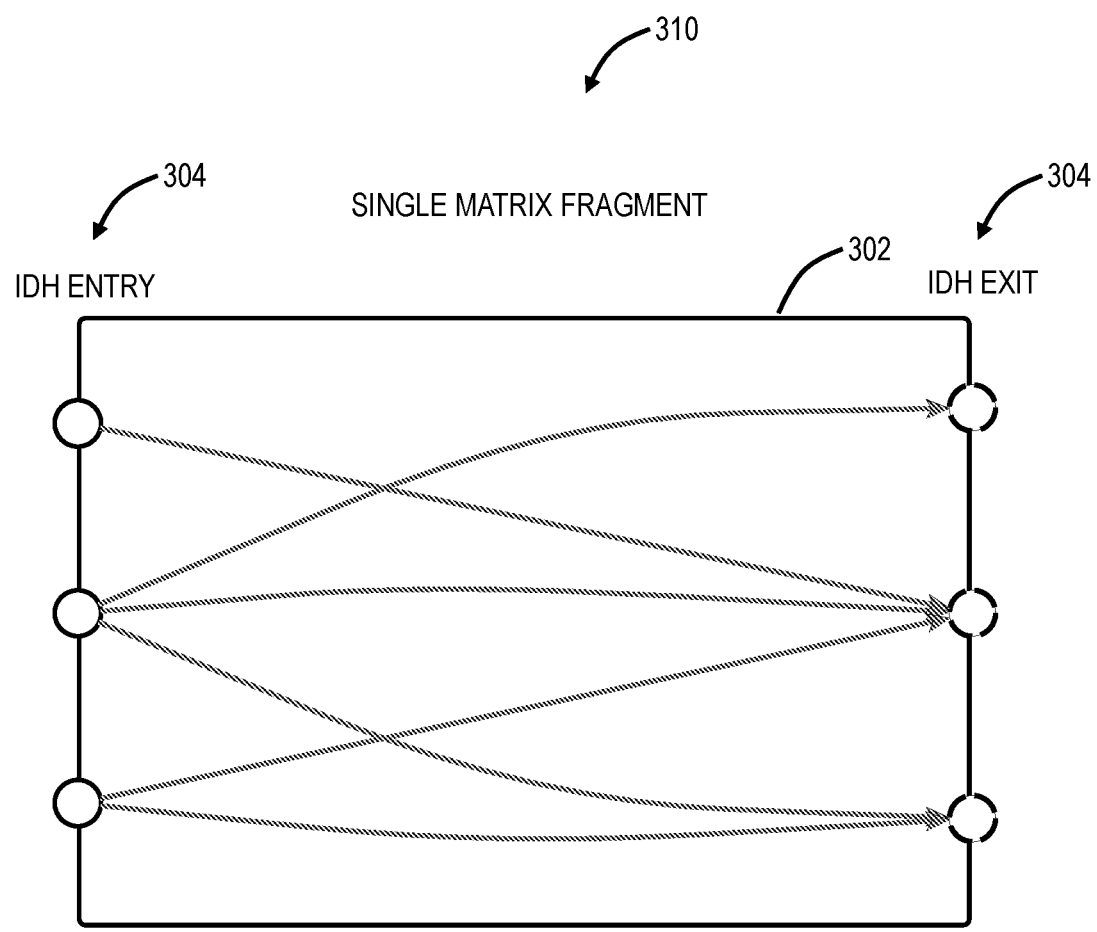
FIG. 5 is a logical diagram of a domain that is an intermediate domain illustrating an A×B matrix.

(ii) Non-source, non-target domains: A×B matrix 310 of A paths entering and B paths leaving. Here, this domain 302 is an intermediate domain with the A paths being A IDH entry points 304 into the domain 302, and the B paths leaving being B IDH exit points 304 out of the domain 302. FIG. 5 is a logical diagram of a domain 302 that is an intermediate domain illustrating an A×B matrix 310.

(iii) Ultimate Target domain: an R×(S+T) matrix with R paths entering, S paths leaving, and T paths terminating inside the domain at the target D. Note, the S paths can leave this target domain, but ultimately lead to the target D again via another intermediate domain.

From the perspective of the privacy requirements, it is important to note that, from the perspective of an individual domain, the "entry" in this matrix is a fully detailed internal domain crossing path, these detailed paths, their internal details are not shared centrally with the orchestrator but only referenced through their endpoints. The endpoint structure (which refers only to start and ending pair, each element of which is either an IDH point 304 or a source/destination point) is the only data needed for the operation of Phase B, described next.

Phase B Description: (Completing Last) Diffusive Trace Interdomain Routing

In Phase B, each IDH point 304 is thought of as a propagator of a "trace-through" message. A single trace-through message is injected at the source, and is forwarded to the points of each of the paths leaving source domain according to the matrix fragments found in Phase A. As the trace-through message propagates, the total weight associated with the through-domain path is added to the running total of the trace-through message. The IDH points 304 visited so far are also appended to the trace-through message as it propagates. At domain boundaries, a single-hop propagation is performed by the orchestrator, which would entail an exchange between peer functions in a federated solution, and the pattern continues. When a target vertex receives messages, the propagation terminates (with path), with the final message containing full route hops being sent to orchestration layer 306. When a message encounters the same node again, the propagation terminates (without path). When a message enters a domain that has no exit path or path connected to the target, the propagation terminates (without path).

Phase B Analysis:

The key points of analysis for Phase B are:

It eventually terminates.

It finds all the paths compatible with the matrix connectivity fragments found in Phase A.

There is a deterministic signal of having completed the calculation, defined as follows. A user-visible/monitorable variable called Total Open Paths (TOP) can be introduced as a global measure and is accessed and maintained via the QOL 306. When the first trace-through is generated at the source, TOP is initiated to TOP=1. At each point of propagation, TOP is increased by (# of alternative branches from the point −1). At each point where a termination (with paths or without), the condition is reached, TOP is decremented by one. Assuming the messaging to orchestrator layer 306 is asynchronous, it is assumed it is at least causal (without re-ordering of events that are causally linked). Given this assumption, TOP will remain strictly non-negative and not return to TOP=0 condition until all paths have been explored. This provides a way for the issuer to monitor and detect the completion of Phase B of the algorithm. Note, an essentially identical monitoring overlay can be used with Phase A; in the scenario where Phase A and Phase B run concurrently, the two TOP variables from each Phase can be used to give the full view of completion.

To complete the problem solution, note that each completed path message has precisely the information needed to reference which path fragments are needed in each respective domain 302, but without any additional detail. Also note, that for purposes of later local referencing or provisioning, this opaqueness means that some local persistence that provides a map from endpoints matrices to the detailed path needs to be maintained after the end-to-end query completes. This can be kept locally in the domains 302 to keep within data privacy requirements, although perhaps suitable encrypted means may allow externalizing if needed for some reason.

Example Operation

Figure 6:
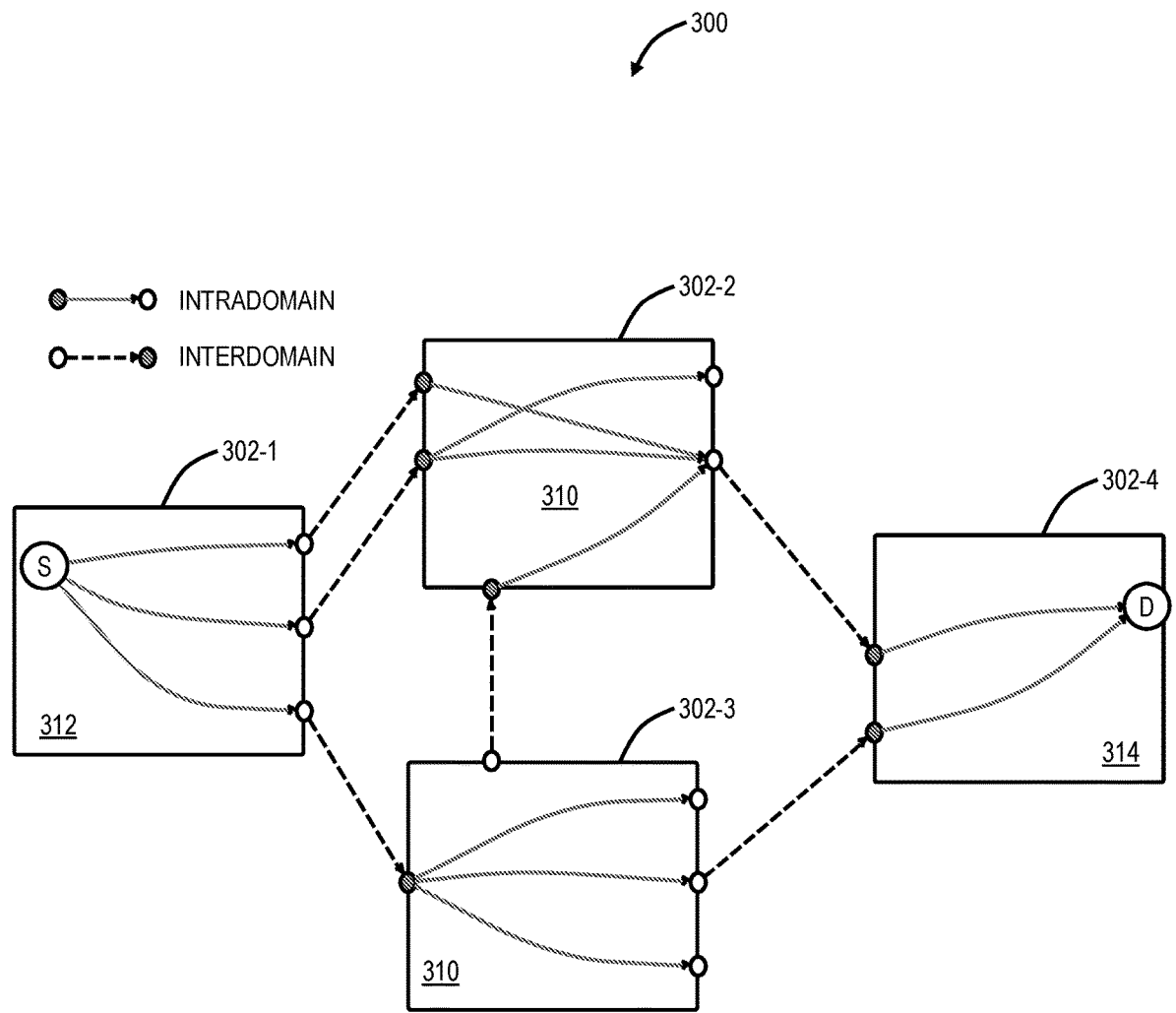
FIG. 6 is a network diagram of the multi-domain network of FIG. 3 illustrating an example operation of Phase A and Phase B for finding a path from the source S in domain 1 to the target D in domain 4.

FIG. 6 is a network diagram of the multi-domain network 300 illustrating an example operation of Phase A and Phase B for finding a path from the source S in the domain 302-1 to the target D in the domain 302-4. From Phase A, there is a 1×3 matrix 312 for the domain 302-1, a 3×2 matrix 310 for the domain 302-2, and a 1×3 matrix 310 for the domain 302-3, and a 2×1 matrix 314 for the domain 302-4. Links can be designated as intradomain links or interdomain links. The intradomain links are from the source S to an IDH exit point 304, from IDH entry point 304 to another exit IDH point 304 within a domain, or from an IDH entry point 304 to the target D. As implied by the name, the intradomain links are entirely contained within a domain 302. The interdomain links are between IDH points 304 in different domains 302, i.e., connecting the domains 302, and the interdomain links include some shared knowledge between the peer domains.

General Analysis/Observations

Again, conventional approaches for multi-domain PCE build off the "crankback pattern," which is based on (i) seeking a single shortest path and (ii) the assumption that finding routes is expensive; the essence of crankback is to go as far as possible toward a destination and only ask for additional paths (in a previously visited domain) if at some point the path fails to reach target subject to constraints.

In the modern NMS context, running on well-provisioned servers, generating multiple paths can occur on a millisecond time scale. This approach described herein takes a fundamentally multi-path, concurrency-oriented posture. Not only does this posture allow various forms of concurrency described below, but it also allows for an exhaustive exploration of all end-to-end possibilities. A legitimate concern of this more concurrent/aggressive approach is that it could incur considerably more work than needed (the work efficiency question) and that this would also lead to longer than necessary compute times. It is possible to "short-circuit" (leading to early termination of specific threads) the various forms of concurrency as soon as the current lowest known total weight renders them fruitless.

Analysis and Special Enhancements:

While the simplest ways of realizing Phase A and Phase B do not require all these points below, a "full implementation" would benefit from the following specific aspects:

1) Concurrency of Phase A (inter-domain, intrinsic to algorithm as stated). There is an intrinsic concurrency in the core algorithm as given since matrix construction can happen simultaneously in each domain.

2) Concurrency of Phase A (intra-domain, optionally engineered): In Phase A, all domains can be solving a sub-fragment (source, multiple-targets) routing problem simultaneously. To the extent of available of CPU (per parallel problem) and memory (Dijkstra working memory; full graph replication not needed), an acceleration of the algorithm is possible.

3) Interleaved Concurrency of Phase A with Phase B: Although descriptively it is convenient to describe Phase A and Phase B as separate phases, it is interesting to note that as soon as any matrix fragment entry found in Phase A is available, it is possible to imagine propagation mechanism as being advanced to at least the "frontier" possible for that matrix fragment entry. Essentially, if one thinks of packets as "scouts" of an unknown landscape, a Phase A—Phase B concurrent algorithm allows the scouts to cross "bridges" between domains as soon as they are found, rather than awaiting some more global condition.

4) Stateful path diversity (providing exhaustiveness): The reference algorithm described herein can exhibit path diversity at the inter-domain level; inside a domain 302, however, there is assumed a single shortest path between any IDH/ source/destination port pairs. To introduce additional diversity in a controlled fashion, one can imagine the state used to find each pair as being retained in memory, and employing an algorithm such as Yen's k-shortest path to generate additional diversity. This is particularly useful if there is some constraint that can only be evaluated once the full end-to-end path is found (via Phase B). If this is the case, the stateful approach can make each Phase A pair (viewed as endpoint constraint) rendered into a "stream" of diverse internal paths rather than a single path. If the constraint is not met with the shortest of each pair (reference algorithm default), a second path for each pair could be introduced, and Phase B continued to run. A useful property of this approach is that it guarantees full exhaustiveness: all possibilities will eventually be considered.

5) Barrier-based early exit mechanisms: As paths of different total weight are observed at target (end conditions of Phase B), one can imagine a broadcast of the Lowest Observed Total Weight (LOTW) back to all participating domains. What this broadcast allows are the following early exit mechanisms:

5a) Phase A early exit: For any ongoing Phase A calculation where total weight is calculated for the prospective path, if the total weight exceeds the current global lowest observed total weight as of last LOTW broadcast, this is now an additional termination condition that effectively prunes down the matrix being calculated for that domain and (may potentially) prevent additional continuations into other domains (that would incur additional calculation effort). Since Phase A calculations only involve total distances within a single domain, in situations where domains have a comparable diameter (path lengths to cross), this exit condition may not play much of a role. However, there is an important corner case (see "whale" case below) that this form of exit avoids a particular worst case.

5b) Phase B early exit: At any point where trace message is analyzed for onwards propagation, if its total weight exceeds the current global lowest observed total weight as of the last broadcast, there is now an additional termination condition for that message that can avoid what would be ultimately fruitless propagation.

Point (5) is important when dealing with "whale" domains. A whale domain can be defined as a domain that has a large amount of path diversity and network diameter (in particular relative to other domains); in naïve forms of multi-domain routing any time a whale domain participates, they will automatically increase the time to complete a query even if they are not ultimately used in the shortest path solution (e.g., two smaller domains are adjacent and don't need to connect through the whale). With early exit, whale scenarios are removed as soon as sufficient short paths are found that bypass the whale: any computations being pursued on the whale that is at a higher cost than the current lowest total weight are terminated.

Specializations & Generalizations

The following specialize or generalize the full implementation described above to meet specific concerns or use cases:

Single Operator Horizontal Scale Specialization:

An important specialization occurs when one thinks of domains 302 as the result of a sharding strategy by a single organization, rather than domains of privacy by multiple organizations. In this specialization, the algorithm works precisely as described but without concern towards the opaqueness of sub-path representation. The reason to pursue this is it can provide a horizontal sharding strategy when memory constraints of a single physical host are exceeded. For extreme-scale networks, one can imagine this specialization to be part of a strategy that uses community discovery that optimize the property of being balanced-as-possible partitions with the desire to have the fewest number of inter-domain links. This is beneficial as Phase B/inter-domain stage may become network I/O bound if inter-domain links are unfavorably dense in the global routing graph.

Memory Efficient Single Source, Multi-Exit:

While canonical Dijkstra can be modified to "terminate on IDH or ultimate destination" by essentially a single line modification, there may be other algorithms (such as Eppstein's) that are more efficient at finding the single source, multiple exit paths. These can be more memory efficient (i.e., by using a path tree), however, do not expect major advantages in run-time relative to the Dijkstra approach.

Other Common NMS Algorithms:

Similar approaches can be used to solve the Steiner tree problem (for multi-pointed services) and diverse path algorithms.

Summary of Support Pathway

As described in problem background, the goal of this exercise is to conserve as much of the operator-specific modeling and technology investments already made by organizations in their NMS PCE; i.e., assume the PCE function has a high cost-to-change in its core aspects. The above algorithm description implies the following points; they are gathered together here to emphasize the minimal nature of what an NMS would need to add and change to participate in this protocol:

1) Mapping of the query to per-domain PCE query: for the type of queries proposed for the federation, any constraints (i.e., inclusions exclusions) needed to be mapped onto the internal PCE query. This is a significantly "thinner," bounded scope adaptation than mapping entire underlying network domain models, which would be needed were we to envisage a centralized PCE. Note these per PCE adaptations would be realized as plugins to the QOL component.

2) Generalization of single shortest path algorithm (e.g., Dijkstra) to a boundary terminating form: By generalizing the exit condition of Dijkstra to having found shortest path to target to "having found shortest path to all vertices having property flag set," this provides the necessary building block for the core algorithm as described above. Fortuitously, the authors found this was a single line code modification relative to their standard PCE Dijkstra implementation.

3) Caching of Phase A path matrices: Within the life-cycle of a global query (extended to the point of provisioning if needed), each domain should be able to maintain a map from point-pairs involving source, target, or IDH points to a detailed internal path, resolved at whatever level detail is standard for the domain operator—typically for NMS, this would be the level of detail needed for direct or onwards element provisioning.

Conditions (1) and (3) are limited in scope and essentially additive requiring no changes to the established codebase. Point (2) requires a specific generalization of what for most domain operator PCEs would be a core algorithm; however, it was found that at least in Dijkstra case, the change was very localized and natural.

Multi-Domain Path Computation Process

Figure 7:
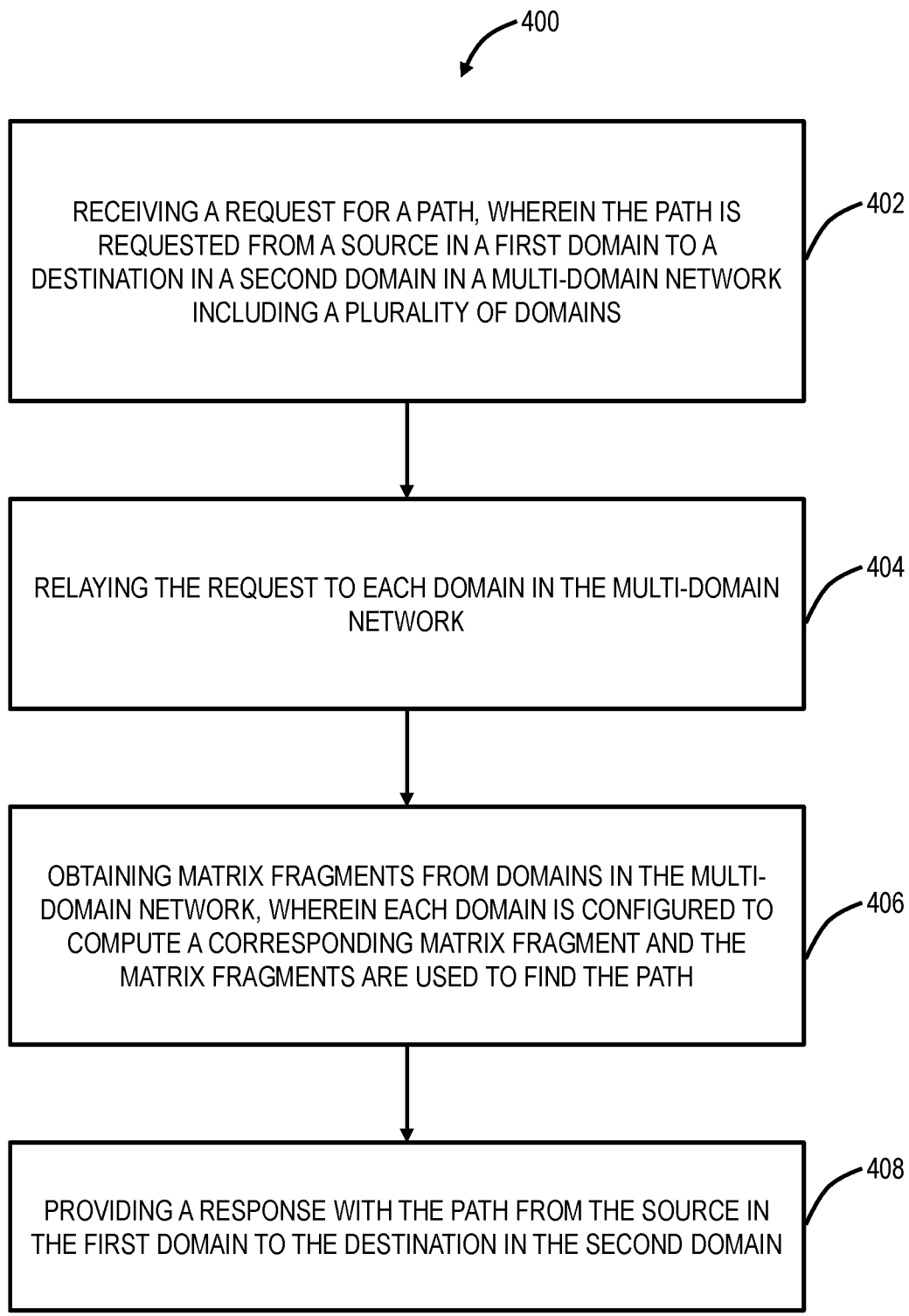
FIG. 7 is a flowchart of a multi-domain path computation process implemented by an orchestration layer.

FIG. 7 is a flowchart of a multi-domain path computation process 400 implemented by an orchestration layer. Referring back to FIG. 4, the orchestration layer 306 can be used to implement all or part of the path computation process 400. In an embodiment, the orchestration layer 306 can include the processing device 200 or instructions embodiment in a non-transitory computer-readable medium. The orchestration layer 306 can implement part or all of the multi-domain path computation process 400. Specifically, the orchestration layer 306 can include an adapter 410 that connects to a domain messaging bus 412, which in turn communicates to each of the domains 302. The orchestration layer 306 can be configured to hide the model details from each domain 302. That is, the domains 302 can have different NMSs, PCEs, etc. with different models. The adapter 410 is configured to handle the interaction and coordination. The orchestration layer 306 can also include coordination 420, 430 for Phases A, B, as well as monitors of variables 432, 434, 436 on the progress. In operation, the orchestration layer 306 can receive a path request 440 via an interface 442. The path request 440 is sent to each domain 302 via the adapter 410.

The multi-domain path computation process 400 includes steps of receiving a request for a path, wherein the path is requested from a source in a first domain to a destination in a second domain in a multi-domain network including a plurality of domains (step 402); relaying the request to each domain in the multi-domain network (step 404); obtaining matrix fragments from domains in the multi-domain network, wherein each domain is configured to compute a corresponding matrix fragment and the matrix fragments are used to find the path (step 406); and providing a response with the path from the source in the first domain to the destination in the second domain (step 408).

Each matrix fragment includes one or more paths through a corresponding domain that have been computed by the corresponding domain with intradomain knowledge and where the intradomain knowledge is excluded from the matrix fragment. Each matrix fragment is one of a 1×N matrix for a domain with the source having N Inter-Domain Handoff (IDH) points, an A×B matrix for an intermediate domain having A ingress IDH points and B egress IDH points, and an R×(S+T) matrix for a domain with the destination having R ingress IDH points, S egress IDH points, and T paths terminating at the destination.

The matrix fragments are determined in a phase A path computation, and wherein the process 400 further includes performing a phase B path computation including finding paths from the source to the destination causing messaging through each internal domain paths in the matrix fragments for each domain of the plurality of domains. The steps can further include performing the phase A path computation and a portion of the phase B computation concurrently as corresponding matrix fragments are determined. The messaging in the phase B path computation can be a trace message that has a weight through the domain added thereto. The steps can further include exiting computation of any path in either the phase A path computation and the phase B path computation based on one or more early exit conditions Details of internal domain paths can be maintained separate from each of the plurality of domains, and wherein the messaging includes quantitative details for path evaluation without exposing data privacy of the corresponding domain.

Figure 8:
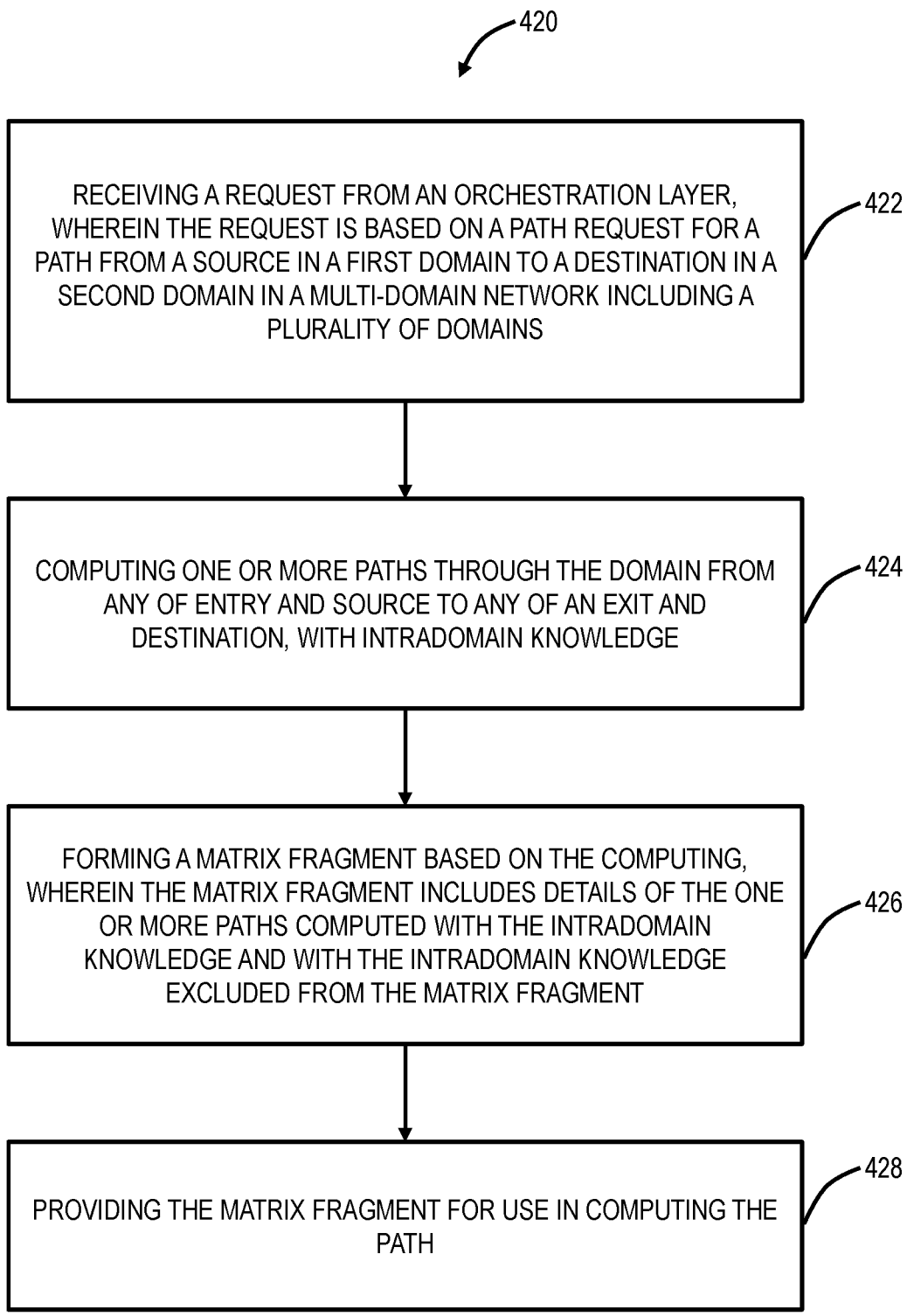
FIG. 8 is a flowchart of a multi-domain path computation process implemented by a domain.

FIG. 8 is a flowchart of a multi-domain path computation process 420 implemented by a domain. The steps include receiving a request from an orchestration layer, wherein the request is based on a path request for a path from a source in a first domain to a destination in a second domain in a multi-domain network including a plurality of domains (step 422); computing one or more paths through the domain from any of entry and source to any of an exit and destination, with intradomain knowledge (step 424); forming a matrix fragment based on the computing, wherein the matrix fragment includes details of the one or more paths computed with the intradomain knowledge and with the intradomain knowledge excluded from the matrix fragment (step 426); and providing the matrix fragment for use in computing the path (step 428).

Again, each matrix fragment is one of a 1×N matrix when the domain includes the source having N Inter-Domain Handoff (IDH) points, an A×B matrix when the domain is an intermediate domain having A ingress IDH points and B egress IDH points, and an R×(S+T) matrix when the domain includes the destination having R ingress IDH points, S egress IDH points, and T paths terminating at the destination. The matrix fragments can be determined in a phase A path computation, and wherein the steps can further include performing a phase B path computation including finding paths utilizing messaging through each internal domain paths in the matrix fragment.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming an orchestration layer to perform steps of:
   receiving a request for a path, wherein the path is requested from a source in a first domain to a destination in a second domain in a multi-domain network including a plurality of domains;
   relaying the request to each domain in the multi-domain network;
   obtaining matrix fragments from domains in the multi-domain network, wherein each domain is configured to compute a corresponding matrix fragment and the matrix fragments are used to find the path;
   causing messaging between the source and the destination utilizing the matrix fragments to trace through and determine weights to select the path; and
   providing a response with the path from the source in the first domain to the destination in the second domain.

2. The non-transitory computer-readable medium of claim 1, wherein each matrix fragment includes one or more paths through a corresponding domain that have been computed by the corresponding domain with intradomain knowledge and where the intradomain knowledge is excluded from the matrix fragment.

3. The non-transitory computer-readable medium of claim 1, wherein each matrix fragment is one of a 1×N matrix for a domain with the source having N Inter-Domain Handoff (IDH) points, an A×B matrix for an intermediate domain having A ingress IDH points and B egress IDH points, and an R×(S+T) matrix for a domain with the destination having R ingress IDH points, S egress IDH points, and T paths terminating at the destination.

4. The non-transitory computer-readable medium of claim 1, wherein the matrix fragments are determined in a phase A path computation, and wherein the steps further include performing a phase B path computation including finding paths from the source to the destination causing messaging through each internal domain paths in the matrix fragments for each domain of the plurality of domains.

5. The non-transitory computer-readable medium of claim 4, wherein the steps further include performing the phase A path computation and a portion of the phase B computation concurrently as corresponding matrix fragments are determined.

6. The non-transitory computer-readable medium of claim 4, wherein the messaging in the phase B path computation is a trace message that has a weight through the domain added thereto.

7. The non-transitory computer-readable medium of claim 4, wherein the steps further include
exiting computation of any path in either the phase A path computation and the phase B path computation based on one or more early exit conditions.

8. The non-transitory computer-readable medium of claim 4, wherein details of internal domain paths are maintained separate from each of the plurality of domains, and wherein the messaging includes quantitative details for path evaluation without exposing data privacy of the corresponding domain.

9. An orchestration layer comprising:
one or more processing devices communicatively coupled to a plurality of domains in a multi-domain network, wherein the one or more processing devices are configured to
receive a request for a path, wherein the path is requested from a source in a first domain to a destination in a second domain in a multi-domain network including a plurality of domains;
relay the request to each domain in the multi-domain network;
obtain matrix fragments from domains in the multi-domain network, wherein each domain is configured to compute a corresponding matrix fragment and the matrix fragments are used to find the path;
cause messaging between the source and the destination utilizing the matrix fragments to trace through and determine weights to select the path; and
provide a response with the path from the source in the first domain to the destination in the second domain.

10. The orchestration layer of claim 9, wherein each matrix fragment includes one or more paths through a corresponding domain that have been computed by the corresponding domain with intradomain knowledge and where the intradomain knowledge is excluded from the matrix fragment.

11. The orchestration layer of claim 9, wherein each matrix fragment is one of a 1×N matrix for a domain with the source having N Inter-Domain Handoff (IDH) points, an A×B matrix for an intermediate domain having A ingress IDH points and B egress IDH points, and an R×(S+T) matrix for a domain with the destination having R ingress IDH points, S egress IDH points, and T paths terminating at the destination.

12. The orchestration layer of claim 9, wherein the matrix fragments are determined in a phase A path computation, and wherein the one or more processing devices are configured to
perform a phase B path computation including finding paths from the source to the destination causing messaging through each internal domain paths in the matrix fragments for each domain of the plurality of domains.

13. The orchestration layer of claim 12, wherein the one or more processing devices are configured to
perform the phase A path computation and a portion of the phase B computation concurrently as corresponding matrix fragments are determined.

14. The orchestration layer of claim 12, wherein the messaging in the phase B path computation is a trace message that has a weight through the domain added thereto.

15. The orchestration layer of claim 12, wherein the one or more processing devices are configured to
exit computation of any path in either the phase A path computation and the phase B path computation based on one or more early exit conditions.

16. The orchestration layer of claim 12, wherein details of internal domain paths are maintained separate from each of the plurality of domains, and wherein the messaging includes quantitative details for path evaluation without exposing data privacy of the corresponding domain.

17. A non-transitory computer-readable medium having instructions stored thereon for programming a processing device associated with a domain to perform steps of:
receiving a request from an orchestration layer, wherein the request is based on a path request for a path from a source in a first domain to a destination in a second domain in a multi-domain network including a plurality of domains;
computing one or more paths through the domain from any of entry and source to any of an exit and destination, with intradomain knowledge;
forming a matrix fragment based on the computing, wherein the matrix fragment includes details of the one or more paths computed with the intradomain knowledge and with the intradomain knowledge excluded from the matrix fragment;
causing messaging between the source and the destination utilizing the matrix fragments to trace through and determine weights to select the path; and
providing the matrix fragment for use in computing the path.

18. The non-transitory computer-readable medium of claim 17, wherein each matrix fragment is one of a 1×N matrix when the domain includes the source having N Inter-Domain Handoff (IDH) points, an A×B matrix when the domain is an intermediate domain having A ingress IDH points and B egress IDH points, and an R×(S+T) matrix when the domain includes the destination having R ingress IDH points, S egress IDH points, and T paths terminating at the destination.

19. The non-transitory computer-readable medium of claim 17, wherein the matrix fragments is determined in a phase A path computation, and wherein the steps further include
performing a phase B path computation including finding paths utilizing messaging through each internal domain paths in the matrix fragment.

20. The non-transitory computer-readable medium of claim 17, wherein the messaging in the phase B path computation is a trace message that has a weight through the domain added thereto.

* * * * *